United States Patent [19]

Howard

[11] 4,148,729
[45] Apr. 10, 1979

[54] SYSTEM FOR STORING AND HANDLING USED COOKING OILS

[76] Inventor: George A. Howard, P.O. Box 1676, Melbourne, Fla. 32901

[21] Appl. No.: 717,472

[22] Filed: Aug. 25, 1976

[51] Int. Cl.² ............................................. B01D 35/02
[52] U.S. Cl. .................................... 210/104; 210/186; 210/295
[58] Field of Search .................. 210/DIG. 8, 71, 172, 210/181, 187, 167, 104, 186, 295; 61/0.5; 220/85 S; 137/13, 236, 334, 571, 575; 110/7 B, 8 R; 165/108

[56] References Cited

U.S. PATENT DOCUMENTS

| | | | |
|---|---|---|---|
| 1,473,358 | 11/1923 | Probst | 210/172 |
| 1,630,714 | 5/1927 | Moir | 165/108 X |
| 2,145,614 | 1/1939 | Stambaugh | 165/10 X |
| 2,644,514 | 7/1953 | Potter | 210/172 |
| 3,626,874 | 12/1971 | Grant | 110/8 R |
| 3,648,595 | 3/1972 | Morris | 210/167 |
| 3,655,051 | 4/1972 | Quase | 210/172 |
| 3,701,313 | 10/1972 | Boggs | 210/167 |
| 3,750,560 | 8/1973 | Holmes | 210/DIG. 8 |
| 3,766,867 | 10/1973 | DeAngelis | 110/7 B |
| 3,894,482 | 7/1975 | Murphy | 210/DIG. 8 |

Primary Examiner—Theodore A. Granger
Attorney, Agent, or Firm—Duckworth, Hobby, Allen & Pettis

[57] ABSTRACT

A system for storing and handling used cooking oils and the like comprises a dump station located adjacent to the kitchen facility in a restuarant for receiving and feeding the used cooking oils through a fill pipe into a remotely located, closed storage container. Heating tubes passing through the fill pipe and the storage container maintain the liquidity of the used cooking oil while moving through the fill pipe and while stored in the container. A pump and control unit is co-located with the storage container for monitoring the temperature of the used oil in the container, and for detecting when the container is filled with the oil so as to provide an indication in the restaurant so that a pump may be energized to thereafter evacuate the storage container.

7 Claims, 2 Drawing Figures

SYSTEM FOR STORING AND HANDLING USED COOKING OILS

BACKGROUND OF THE INVENTION

1. Field of the Invention

The present invention relates to systems for handling and storing used cooking oil in restaurants and similar facilities.

2. Description of the Prior Art

There has been a tremendous proliferation of fast food restaurants in the United States in recent years. These facilities employ large quantities of cooking oils for frying hamburgers, potatoes, sea food, chicken and sundry other food stuffs.

Many state and municipal health codes specify that these cooking oils, after being used for cooking purposes, cannot be reused in a manner intended for human consumption. But used cooking oils do have utility as a base for soap, glue, animal food and the like. To this end, many fast food restaurants have developed procedures for storing these used oils for resale. However, these oils frequently contain food particles and other solids. Further, at room temperature these oils solidify, and are difficult to work with.

Prior art patents of interest to the present invention include U.S. Pat. No. 2,745,572 to Talbott, which discloses a dispensing system for applying molasses to stock feed in which a storage tank holds the molasses and has a heating element for maintaining the molasses in a fluid condition, the system also including a pump with a flexible hose and certain valves for operating the system in the intended manner. In U.S. Pat. No. 2,258,637, Young dicloses a storage system for oil.

Additionally, there are a large number of prior art patents which disclose techniques for handling used cooking oils for regenerating the oil at the restaurant for reuse. See, for example, U.S. Pat. Nos. 3,368,682; 2,698,092; 3,107,601; 3,613,550; 3,707,907; 3,517,732; 3,613,555.

In U.S. Pat. No. 2,122,260, Moore et al. disclosed a system for deodorizing and bleaching oils. Fresenius, in U.S. Pat. No. 722,832, discloses a method of purifying cooking fats; a similar arrangement is disclosed in U.S. Pat. No. 2,075,070 to Upton.

In U.S. Pat. No. 3,646,882, Keating discloses an in situ filter for a deep fat fryer; a similar system is disclosed in U.S. Pat. No. 3,759,388 to Thomason. A pressurized cooking system useful in fast food restaurant facilities is disclosed in U.S. Pat. No. 3,608,472 to Pelster et al.

SUMMARY OF THE INVENTION

The present invention contemplates a system for storing used cooking oils in a restaurant facility of the type having a kitchen area where said cooking oils are used, the system comprising a storage container located away from the kitchen area and a used oil dump station in the kitchen area. Preferably, the dump station is mounted in a wall of the kitchen area, and includes a fill pipe for draining used oil from the dump station and into the storage container.

Means are provided for heating the oil while in the fill pipe and also while in the container, and further means are included for filtering the oil; preferably, the filter is located at the dump station and is easily removable to facilitate frequent cleaning.

Means are provided for pumping the oil out of the storage container; suitably, the pump is located immediately adjacent the storage container and away from the kitchen area. Means are further provided for sensing when the storage container is full of the oil, so as to provide a full indication at a monitoring position outside the storage tank. This monitoring position may be immediately adjacent to the pump, but preferably is located inside the restaurant facility, for example at the manager's desk. A switch is provided, and may be co-located adjacent the full indicator, for energizing the pump.

An important aspect of the system of the present invention is the ability to maintain the liquidity of the cooking oil from the point of drainage and during storage. To facilitate this, the system further includes means for sensing the temperature of the oil in the storage container and providing an indication when a predetermined temperature of the oil is reached.

THE DRAWINGS

DETAILED DESCRIPTION OF THE DRAWINGS

Figure 1:
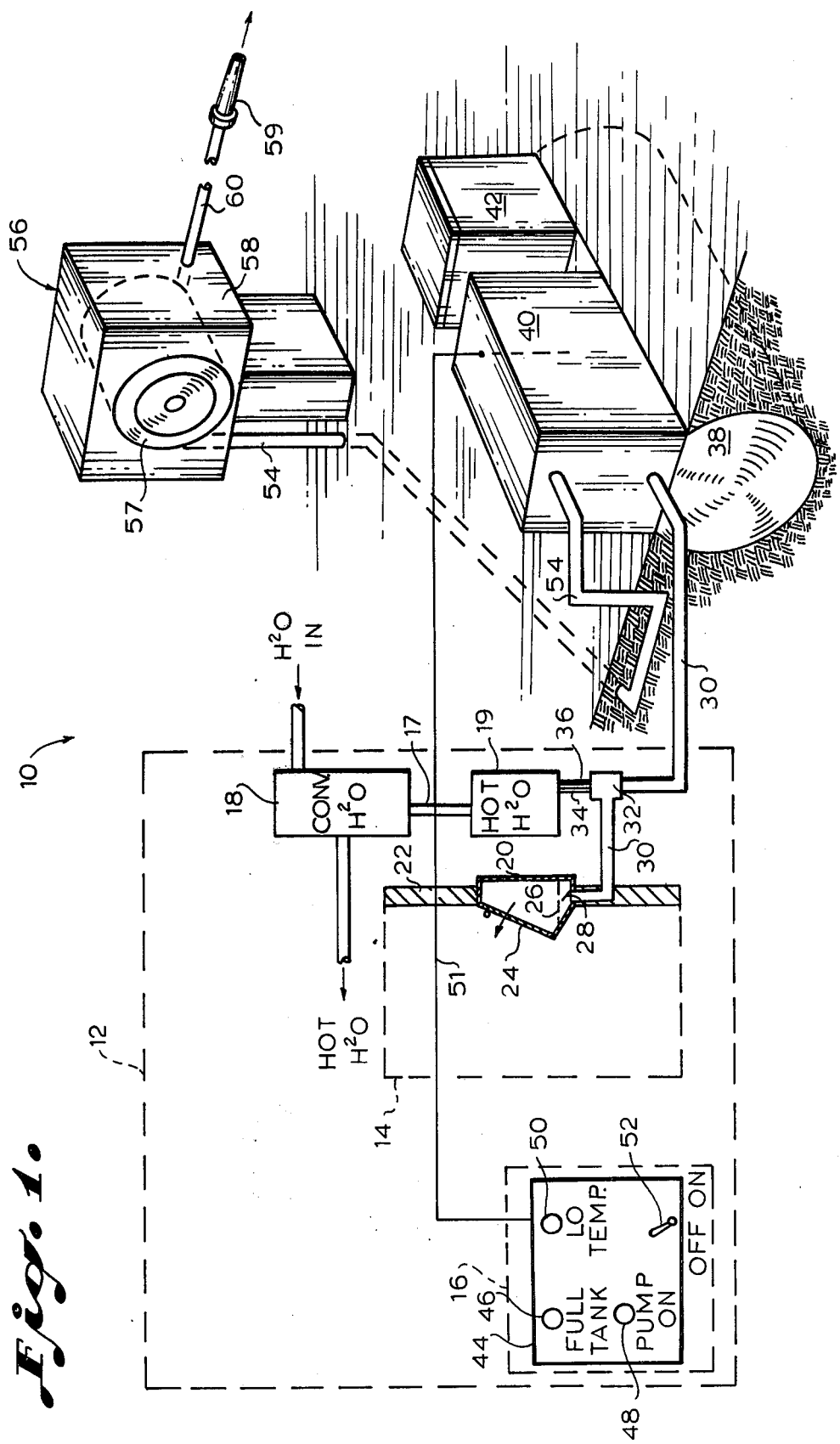
FIG. 1 is a side view, partially in schematic and block diagram form, of the system in accordance with the present invention.

A preferred embodiment of the system in accordance with the present invention will now be described with reference to the drawing.

With specific reference to FIG. 1, the system of the present invention, which is referred to generally as 10, is used in conjunction with a restaurant facility 12 denoted graphically by a dotted line having a kitchen area 14 likewise illustrated. The restaurant may include a manager's area, preferred to generally as 16. The restaurant 12 may include a conventional hot water tank 18, into which water is received from a public water system and out of which hot water is supplied to the restaurant 12.

In accordance with the present invention, the system 10 is provided with a closed cycle hot water tank 19 fed from a pipe 17 from the conventional hot water tank 18.

The system 10 further includes a used cooking oil dump station 20, which preferrably is flush mounted in a wall 22 (depicted in cross-section in FIG. 1) of the kitchen area 14, and including a hinged door 24 which opens into the kitchen area. The dump station 20 is further provided with a screen filter 26, and a cover 28 at the drain end of the station.

A fill pipe 30 is coupled at one end at the drain end of the dump station 20, so as to allow used cooking oil to be drained from the dump station and into a storage container 38, described in greater detail below. The fill pipe 30 is provided with an elbow 32 into which a heating tube 34 and a return tube 36 extend through the fill pipe from the closed cycle hot water tank 19.

Preferably, the storage container 38 is located at a point remote from the kitchen area 14; suitably, the storage container 38 is buried beneath ground level. Co-located with the storage container 38 is a pump and control unit 40, the container 38 and unit 40 being described in greater detail below with reference to FIG. 2. The storage container 38 is provided with an access vent 42 for purposes of cleaning and service.

A monitoring unit is provided inside the restaurant facility 12, preferably in the manager's area 16. This monitoring unit 44 is coupled to the pump and control unit 40 via a circuit trunk 51 and includes three indicators 46, 48 and 50 and a single switch 52. The first indicator 46 cooperates with a float valve 84 (FIG. 2) in the storage container 30 to provide a "full tank" indication when that the storage container is full of used oil. The second indicator 48 provides a visual "pump on" indication when the switch 52 is in the "on" position. The third indicator 50 cooperates with a thermostat 96 (FIG. 2) to provide a "low temperature" indication when the temperature of the oil within the storage container is below a temperature necessary to maintain the liquidity of that oil.

Upon energization of the pump within the pump and control unit 40 by operation of the switch 52, used cooking oil is pumped out of the storage container 38 via a drain pupe 54 to a disposal unit 56. The disposal unit includes a rotatable reel 57 mounted inside a cabinet 58. The drain pipe 54 is coupled to a hose 60 wrapped about the reel 57, allowing the hose to be extended for pumping the used oil through a nozzle 59 into a tanker truck or any other type of container.

Specific features of the system 10, particularly the storage container 38 and the pump and control unit 40 will now be described with reference to FIG. 2.

Figure 2:
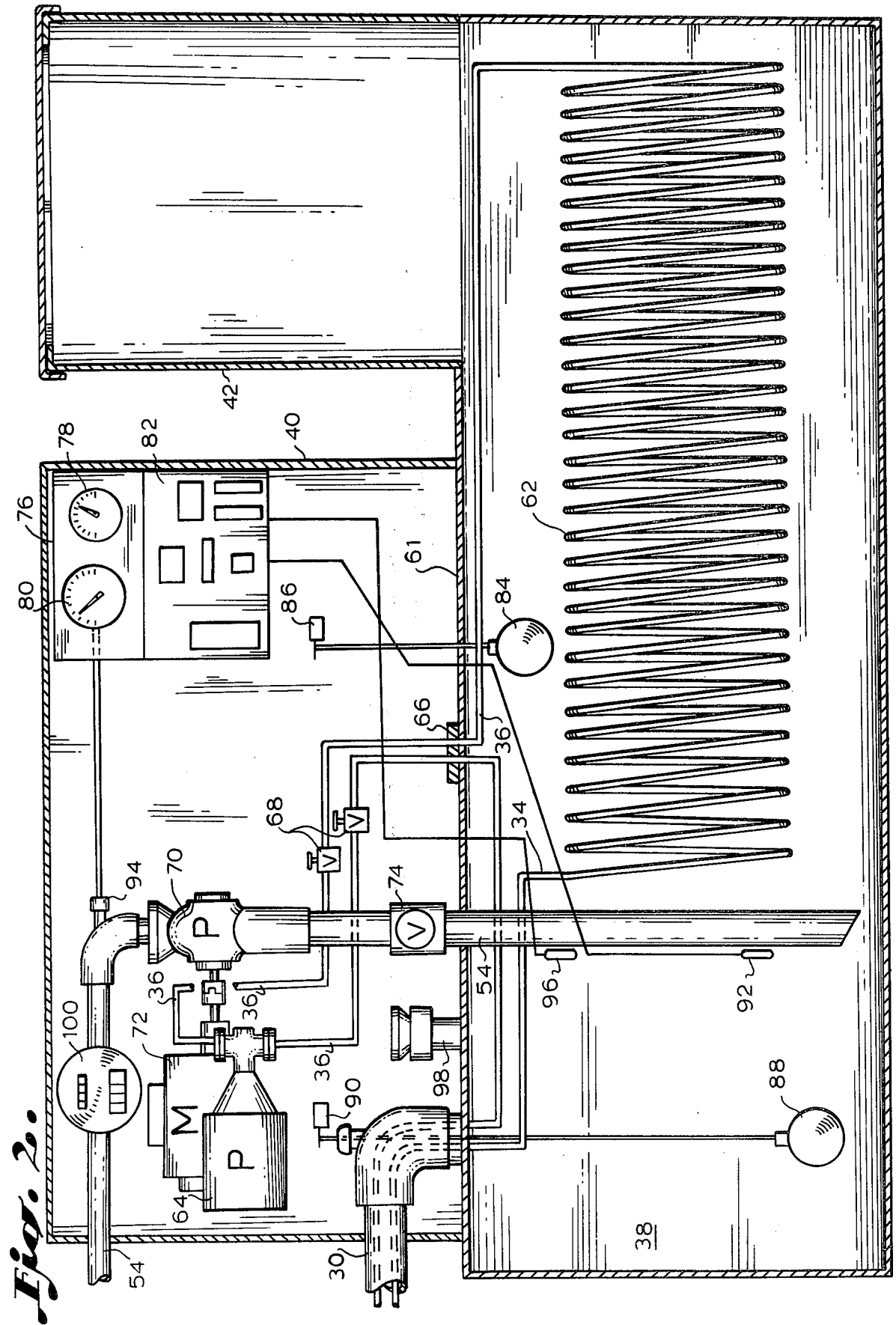
FIG. 2 is a side elevation of the storage container and pump and control unit shown in FIG. 1.

Noting FIG. 2, 61 denotes a wall between the storage container 38 and the pump and control unit 40. The system 10 is provided with a heating coil 62 extending through the storage container 38 and coupled between the heating tube 34 and the return tube 36, such that a heated fluid passing through the heating tube 34 likewise passes through the heating coil 62 and into the return line 36. Movement of the heating fluid is facilitated via a pump 64 coupled in the return line 36 and located with the pump and control unit 40. The return tube 36 passes through a seal 66 in the wall 61 between the storage tank 38 and the unit 40. Two gate valves 68 are provided in the return line 36 within the unit 40 for controlling the flow of hot fluid in the heating system.

Pumping of the used cooking oil within the storage container 38 is facilitated with a rotary pump 70 located in the unit 40 which is operated by a motor 72 in a conventional manner to draw the liquid oil out of the storage container through the drain pipe 54. As shown in FIG. 2, the pump 70 is interposed in the drain pipe 54. As there shown, the drain pipe 54 extends to the bottom of the storage container 38 so as to facilitate a complete removal of most of the used oil. A check valve 74 is positioned in the drain pipe 54 between the extremity thereof and the rotary pump 70.

The condition and amount of used oil in the storage container 38 is sensed in a conventional manner to provide indications of these conditions through a control panel 76 located within the pump and control unit 40. The control panel 76 includes a themometer 78 and a pressure gage 80 which are depicted graphically in FIG. 2. Additionally, the control panel 76 includes a circuit panel 82, which routes electric signals representative of certain of the conditions to the monitoring panel 44 located in the manager's area 16 within the restaurant facility 12.

A first condition is monitored by a "full" float 84 at the upper extremity of the storage container 38. The float 84 operates a transducer 86, which in turn provides electrical signals to the control panel 76 in a conventional manner so as to energize the "full tank" indicator 46 on the monitoring panel 44. An "empty" float 88 is positioned at the bottom extremity of the storage container 38, and is coupled to a transducer 90 so as to provide a means for automatically shutting down the rotary pump 70 and associated motor 72 when the level of used oil in the storage container 38 reaches the bottom extremity of the drain pipe 54.

A temperature sensor 92 extends into the storage tank 38 and is connected to the control panel 76 to operate the themometer 78 in a well known manner. Likewise, a pressure sensor 94 extends into the drain pipe 54 adjacent the pump 70 and is coupled to the pressure gage 80 on the control panel 76 so as to monitor the pressure of the cooking oil during drainage operations.

The system 10 is further provided with a thermostat 96 extending into the storage container 38 and coupled to the circuit panel 82 for providing a "low temperature" indication 50 at the monitoring panel 44 in the manager's area 16 when the oil reaches predetermined temperature. For example, this temperature may be selected as a point at which the used cooking oil in the storage container 38 begins to solidify.

A vent 98 extends through the wall 61 between the storage container and into the unit 40 to prevent dangerous pressure buildups in the container 38.

The system 10 operates in the following manner. As noted previously, used cooking oils are poured into the dump station 20 and through the filter screen 26, so as to thereafter pass into the fill pipe 30. During movement of the oil through the fill pipe 30, the oil is maintained at a sufficient temperature by the heating tube 34 to insure that the oil drains completely into the storage container 38. It will be understood that the filter screen 26, which is located at the dump station 20, can be easily removed and cleaned by restaurant personnel operating in the kitchen area 14.

As the used cooking oil accumulates in the storage container 38, the oil is maintained in a liquid condition by the heated water passing through the heating tube 34 and the coil 62. At such time as the container is filled with cooking oil, the float valve 84 initiates the indicator 46 on the monitor panel 44 in the manager's area 16, thereby allowing the manager to switch the pump 70 and motor 72 into an operating condition by operation of the switch 52. At the same time, the "pump on" indication 48 is illuminated. Thereafter, the pump 70 continues to operate until the storage container 38 is evacuated, that is, until the level of cooking oil reaches the level of the float valve 88. At this time, the float valve 88 operates the switch 90 thereby automatically shutting off the motor 72.

The thermostat 96 is selected to provide an indication into the control panel 76 when the temperature of the cooking oil is at, or below a predetermined point. This temperature is selected at a point at which the oil begins to solidify. The thermostat 96 forwards an electrical signal to the "low temperature" indication 50 on the monitoring panel 44, thereby giving an indication that the closed cycle hot water tank 19 and the hot water passing through the heating tube 34 and the coil 62 is at an insufficient temperature to maintain the cooking oil in the storage container 38 in a liquid condition. Other systems functions can also be monitored on the face of the control panel 76, such as the temperature of the cooking oil at the themometer 78 and the pressure of the oil in the drain pipe 54 via the pressure gage 80.

Although not essential to the operation of the system 10, a flow meter 100 is interposed in the drain pipe 54, in order to measure the amount of oil for resale purposes.

I claim:

1. Apparatus for storing used cooking oils in a restaurant facility of the type having a kitchen area where said cooking oils are used, said apparatus comprising:
   a storage container located away from said kitchen area;
   a used oil dump receptacle with a screen inlet located in said kitchen area;
   a heated pipe coupling said dump receptacle to said storage container such that oil dumped into said receptacle flows into said storage container;
   means for heating said oil while in said pipe and while in said storage container, said heating means comprising:
      a heating tube having a diameter substantially less than said pipe, said heating tube extending through said pipe;
      a return tube extending through said pipe;
      a coil extending through said storage container and coupled between said heating tube and said return tube;
      means for circulating a fluid through said heating tube, said coil and said return tube; and
      means coupled between said heating tube and said return tube for heating said fluid;
   means for pumping said oil through an outlet of said storage container;
   indicating means for sensing when said storage container is full of oil; and
   a switch outside of said storage container for energizing said pumping means.

2. The system recited in claim 1 wherein said fluid comprises water, said means for heating said fluid comprising a closed cycle hot water heater coupled between said heating tube and said return tube.

3. The system recited in claim 1, said circulating means comprising a pump for pumping said fluid from said heating tube, through said coil and into said return tube, said pump located outside and adjacent to said storage container.

4. The system recited in claim 1 further comprising:
   means in said storage container for sensing the temperature of said oil therein; and
   means for providing a temperature limit signal at said point responsive to outputs from said temperature sensing means.

5. The system recited in claim 1 further comprising means for sensing removal of most of said oil from said storage container and for deenergizing said oil pumping means responsive thereto.

6. The system recited in claim 1 further comprising:
   a rotatable drum outside of said storage container and away from said remote site;
   a flexible hose wrapped about said rotatable drum; and
   means coupling said flexible hose to an output of said oil pumping means.

7. The system recited in claim 1 wherein said full container sensing means and said switch are located within said restaurant facility.

* * * * *